J. F. Jaquess,
Harrow.
No. 111,125.    Patented Jan. 24, 1871.
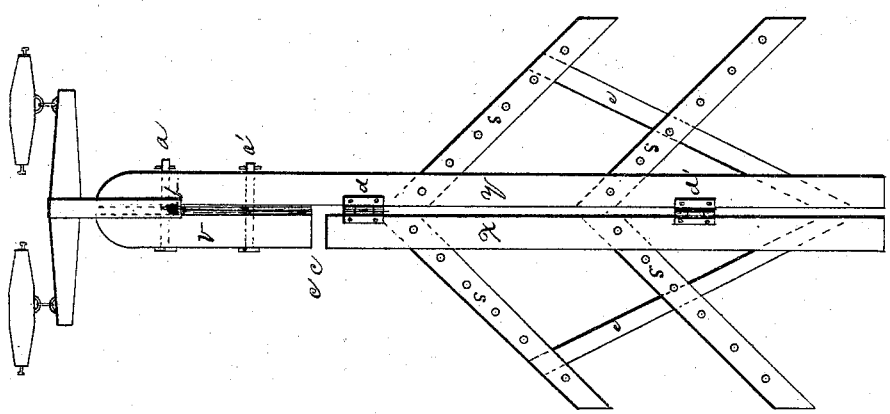
Witnesses:
J. C. Connolly
J. & F. Holmead
Inventor
James F. Jaquess

United States Patent Office.

JAMES F. JAQUESS, OF COMMERCE, MISSISSIPPI.

Letters Patent No. 111,125, dated January 24, 1871.

IMPROVEMENT IN HARROWS AND CULTIVATORS.

The Schedule referred to in these Letters Patent and making part of the same.

I, JAMES F. JAQUESS, of Commerce, in the county of Tunica and State of Mississippi, have invented a certain Improvement on the useful Agricultural Implements—the Harrow and Cultivator.

Nature and Objects of the Invention.

My invention consists in a center-draft detached head for harrows and cultivators of all sizes and dimensions, the object of which improvement is to greatly increase the efficiency and usefulness of these implements of husbandry, as hereafter illustrated.

Description of the Accompanying Drawing and other Explanations.

The drawing is intended to represent a harrow or cultivator of the most approved form or construction, of two parts or wings, held together by two sets of hinges.

General Description.

The center-draft detached head is formed by cutting off one of the middle pieces or timbers $x$ and $y$, say $x$ at the point $c$, just back of the bolt $a'$, making the aperture or incision $c\ c$. The part $v$, separated from the center piece $x$, is fastened firmly to the front end of the other center piece $y$ by the bolts $a$ and $a'$. Or the head may be formed by a simple enlargement of the front end of one of the middle pieces $x$ and $y$—for example $y$—the enlargement extending back toward the piece $x$, but not touching it, leaving the opening $c\ c$, as in the other case. The principle is the same however the head may be formed, and the same principle is retained in the detachment; and the draft is established and retained in the center of motion, and the wings or two divisions of the implement are held together by the hinges $d$ and $d'$.

By this arrangement and combination the wings $s$ have a free and unobstructed motion up and down, and thus the harrow or cultivator most readily and promptly accommodates itself to the surface of the ground.

It is not claimed in this application for Letters Patent that the particular form or general construction of the implement described and represented in the drawing contains or embraces anything novel or patentable; but it is believed and claimed that the detachment, with the draft still retained on a line with the center of motion, is new, important, and useful, and that it is this principle or combination that constitutes the superiority of implements thus constructed with this improvement over all that have preceded them.

I ask, therefore, that this principle and construction be embraced and incorporated into Letters Patent to me "on an improvement on harrows and cultivators."

I, JAMES F. JACQUESS, claim as my invention—

The above-described "center-draft detached head for the harrow and cultivator," without any reference to the particular form or model after which the body or parts of the implement may be constructed.

JAMES F. JAQUESS.

Witnesses:
    THOMAS C. CONNOLLY,
    G. E. F. HOLMEAD.